(12) United States Patent
Chigurupati et al.

(10) Patent No.: US 12,505,450 B2
(45) Date of Patent: Dec. 23, 2025

(54) SYSTEMS AND METHODS FOR DYNAMIC DATA GENERATION AND CRYPTOGRAPHIC CARD AUTHENTICATION

(71) Applicant: Capital One Services, LLC, McLean, VA (US)

(72) Inventors: Srinivasa Chigurupati, Long Grove, IL (US); Kevin Osborn, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/890,077

(22) Filed: Aug. 17, 2022

(65) Prior Publication Data

US 2024/0062216 A1    Feb. 22, 2024

(51) Int. Cl.
*G06Q 20/40*    (2012.01)
*G06Q 20/38*    (2012.01)

(52) U.S. Cl.
CPC ..... *G06Q 20/4018* (2013.01); *G06Q 20/3829* (2013.01); *G06Q 20/405* (2013.01)

(58) Field of Classification Search
CPC .......... G06Q 20/4018; G06Q 20/3829; G06Q 20/405
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Muhammet Yildiz, Combining Biometric ID Cards and Online Credit Card Transactions, 2010, p. 20-23 (Year: 2010).*

(Continued)

*Primary Examiner* — Ibrahim N El-Bathy
(74) *Attorney, Agent, or Firm* — KDW Firm PLLC; Andrew D. Kasnevich

(57) ABSTRACT

Systems and methods for authentication may include an authentication system. The authentication system may include a processor and a memory. The memory may contain a unique identifier, a counter, a session key, and a PAN sequence number. The processor may be configured to receive an authentication request. The processor may be configured to generate, in response to the authentication request, a virtual card number and a dynamic security code based on mapping with a plurality of parameters of a cryptogram including at least one selected from the group of the unique identifier, the counter, the session key, and the PAN sequence number. The processor may be configured to transmit the virtual card number and the dynamic security code to complete the authentication request.

20 Claims, 8 Drawing Sheets

(56) References Cited

U.S. PATENT DOCUMENTS

| | | |
|---|---|---|
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |

(56) References Cited

U.S. PATENT DOCUMENTS

| | | |
|---|---|---|
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B2 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,565,587 B1 | 2/2020 | Newman et al. |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |

(56) References Cited

U.S. PATENT DOCUMENTS

| | | |
|---|---|---|
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0078549 A1 | 3/2011 | Thueringer et al. |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218907 A1* | 9/2011 | Dessert .......... G06Q 30/02 705/39 |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0157042 A1* | 6/2012 | McCanna .......... H04M 15/83 455/407 |

(56) References Cited

U.S. PATENT DOCUMENTS

| | | |
|---|---|---|
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0252565 A1* | 10/2012 | Clarebrough ........... G07F 17/32 463/31 |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232035 A1* | 9/2013 | Stijen ................... G06Q 20/102 705/26.81 |
| 2013/0232082 A1 | 9/2013 | Krawczewicz et al. |
| 2013/0238894 A1 | 9/2013 | Ferg et al. |
| 2013/0246199 A1* | 9/2013 | Carlson ................ G06Q 20/405 705/16 |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |

(56) References Cited

U.S. PATENT DOCUMENTS

| | | |
|---|---|---|
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0065803 A1* | 2/2020 | Abouelenin ......... G06Q 20/388 |
| 2020/0104841 A1* | 4/2020 | Osborn ................. H04L 9/0643 |
| 2020/0143382 A1 | 5/2020 | Krob |
| 2021/0004806 A1 | 1/2021 | Noe |
| 2021/0201210 A1* | 7/2021 | Navin .................... G06Q 20/02 |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0058617 A1* | 2/2022 | Tibrewala ............. H04L 63/083 |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0281606 A1* | 9/2023 | Jakobsson .......... G06Q 20/3829 705/67 |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 9910824 A1 | 3/1999 |
| WO | 0049586 A1 | 8/2000 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/

(56) References Cited

OTHER PUBLICATIONS

05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
The International Search Report and Written Opinion mailed Dec. 12, 2023 in related PCT/US23/30131 (12 pages).
Author Unknown, "Global expansion of card tapping mobile OTP for security and convenience is imminent," Jun. 28, 2022, website: https//www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

420

SYSTEMS AND METHODS FOR DYNAMIC DATA GENERATION AND CRYPTOGRAPHIC CARD AUTHENTICATION

FIELD OF THE DISCLOSURE

The present disclosure relates to systems and methods for dynamic data generation and cryptographic card authentication.

BACKGROUND

Electronic and card-based transactions are becoming increasingly common. These transactions often involve the use of a card in communication with a point of sale device, a server, or other device. It is necessary to protect such communications from interception and unauthorized access. Virtual card numbers may offer a way for users for users to use an account without exposing an underlying account number.

Presently, virtual card numbers that are generated are static in nature, thereby creating exposure to malicious actors. For example, malicious actors seeking unauthorized account access and to misuse account information may perform brute force attacks against static virtual card numbers, which leads to security vulnerabilities.

Further, the transmission of data without encryption or other protection is susceptible to malicious attacks, data interception, and may have other vulnerabilities, resulting in increased security risks and increased risks of account or card misuse. These risks may be further increased through the use of contactless cards, which communicate with other devices wirelessly.

Measures taken to address security risk may consume system resources and hinder operational efficiency. For large numbers of transactions, the consumption of system resources and the hindrance of transaction efficiency can increase, which may result in a failure to perform transactions or unsatisfactory performance.

These and other deficiencies exist. Accordingly, there is a need to securely and dynamically generate data and to cryptographically perform card authentication.

SUMMARY OF THE DISCLOSURE

Embodiments of the present disclosure provide an authentication system. The authentication system may include a processor and a memory. The memory may contain a unique identifier, a counter, a session key, and a primary account number (PAN) sequence number. The processor may be configured to receive an authentication request. The processor may be configured to generate, in response to the authentication request, a virtual card number and a dynamic security code based on mapping with a plurality of parameters of a cryptogram including at least one selected from the group of the unique identifier, the counter, the session key, and the PAN sequence number. The processor may be configured to transmit the virtual card number and the dynamic security code to complete the authentication request Embodiments of the present disclosure provide a method of authentication. The method may include receiving an authentication request. The method may include generating, by the processor in response to the authentication request, a virtual card number and a dynamic security code based on mapping with a plurality of parameters of a cryptogram including at least one selected from the group of a unique identifier, a counter, a session key, and a PAN sequence number. The method may include transmitting, by the processor, the virtual card number and the dynamic security code to complete the authentication request.

Embodiments of the present disclosure provide a computer accessible non-transitory medium comprising computer executable instructions that, when executed on a processor, perform procedures comprising the steps of: receiving an authentication request; generating, in response to the authentication request, a virtual card number and a dynamic security code based on mapping with a plurality of parameters of a cryptogram including at least one selected from the group of a unique identifier, a counter, a session key, and a PAN sequence number; and transmitting the virtual card number and the dynamic security code to complete the authentication request.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Systems and methods disclosed herein enable provisioning and usage of a dynamic card verification value for a generated virtual card number. Such an implementation provides controlled utilization of these parameters and may be only be refreshed upon physical possession of the card. By doing so, security vulnerabilities associated with virtual card numbers may be reduced. For example, the risk of brute force attacks and also fraud in card-not-present transactions, including but not limited to security verification transactions, authorization access transactions, and other non-ecommerce transactions, may be reduced.

In addition, the systems and methods disclosed herein allow for the avoidance of phishing attacks, the prevention of replay attacks, and the unauthorized interception of data through encrypted data communications. Accordingly the risk of these vulnerabilities, and others, may be reduced.

The systems and methods disclosed facilitate the performance of transactions, promotes transactional efficiency, and efficiently uses system resources. These benefits become increasingly important as the volume of transactions increases.

Further, the systems and methods disclosed herein achieve these benefits without degrading the user experience. By promoting the user experience, users will be more likely to engage in more secure transactions.

Figure 1:
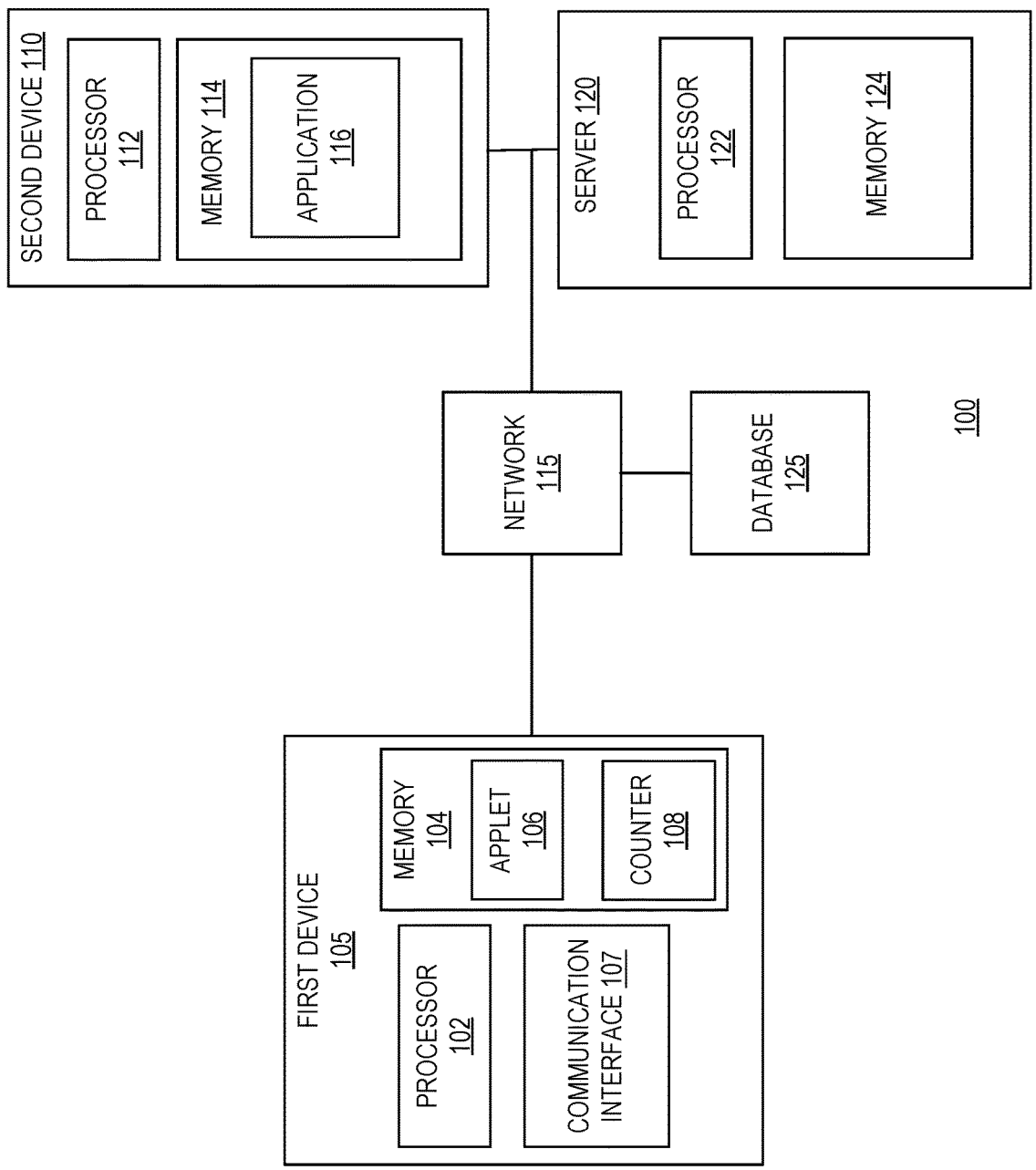
FIG. 1 depicts an authentication system according to an exemplary embodiment.

FIG. 1 illustrates an authentication system 100. The system 100 may comprise a first device 105, a second device 110, a network 115, a server 120, and a database 125. Although FIG. 1 illustrates single instances of components of system 100, system 100 may include any number of components.

System 100 may include a first device 105. The first device 105 may comprise a contactless card, a contact-based card, a network-enabled computer, or other device described herein. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, a mobile device, a wearable device, a client device, or other device. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, a unique identifier, an applet version number, a sequence number, and a plurality of keys.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as near field communication (NFC), Bluetooth, Wi-Fi, Radio Frequency Identification (RFID), and other forms of contactless communication. As shown in FIG. 1, the communication interface 107 may be configured to communicate directly with the second device 110, server 120, and/or database 125 via network 115.

First device 105 may be in data communication with any number of components of system 100. For example, first device 105 may transmit data via network 115 to second device 110, and/or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include a second device 110. The second device 110 may include one or more processors 112, and memory 114. Memory 114 may be a transitory and/or non-transitory memory and may include one or more applications, including but not limited to application 116. Second device 110 may be in data communication with any number of components of system 100. For example, second device 110 may transmit data via network 115 to server 120. Second device 110 may transmit data via network 115 to database 125. Without limitation, second device 110 may be a network-enabled computer. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Server 120 may be configured as a central system, server or platform to control and call various data at different times to execute a plurality of workflow actions. Server 120 may be configured to connect to first device 105. Server 120 may be in data communication with the applet 106 and/or application 116. For example, a server 120 may be in data communication with applet 106 via one or more networks 115. First device 105 may be in communication with one or more servers 120 via one or more networks 115, and may operate as a respective front-end to back-end pair with server 120. First device 105 may transmit, for example from applet 106 executing thereon, one or more requests to server 120. The one or more requests may be associated with retrieving data from server 120. Server 120 may receive the one or more requests from first device 105. Based on the one or more requests from applet 106, server 120 may be configured to retrieve the requested data. Server 120 may be configured to transmit the received data to applet 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The processor 102 may be configured to receive an authentication request. In some examples, the processor 102 may be configured to receive an authentication request from any device, including but not limited to a client device 110. In other examples, the application 116 of the client device 110 may be configured to receive the authentication request from processor 122 of server 120. The application 116 of the client device 110 may be configured to conduct one or more reads of the first device 105, such as the card. For example, the application 116 may be configured to conduct a read, such as a near field communication read, of a tag of the first device 105. In some examples, the application 116 may be configured to read information including a unique identification number associated with the first device, a counter (e.g. a counter associated with a number of reads of the first device, a counter associated with the number of transactions involving the first device, an application transaction counter), or a shared secret. In some examples, the application 116 can be configured to read a cryptogram generated using one or more cryptographic algorithms. The cryptogram can be dynamically generated as described herein in response to the authentication request. In some examples, the shared secret can be a number that is known or derived by the server 120 and/or the client device 110 and stored on the first device 105. The shared secret can be included in cryptographic calculations (e.g., used in cryptographic operations and by cryptographic algorithms) but is not transmitted between any of the devices.

The processor 102 may be configured to generate, in response to the authentication request, a virtual card number and a dynamic security code based on mapping with a plurality of parameters of a cryptogram including at least one selected from the group of the unique identifier, the counter, the session key, and the primary account number (PAN) sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

The processor 102 may be configured to transmit, after entry into one or more communication fields of any device, including but not limited to second device 110, data responsive to the read, such as a first read. For example, the processor 102 may be configured to transmit, after a first entry into a first communication field of a second device 110, the cryptogram. Without limitation, each entry may be associated with a tap, a swipe, a wave, and/or any combination thereof. The cryptogram may be received, upon request, via a near field communication data exchange format (NDEF) read. The processor 102 may be configured to transmit the cryptogram. In some examples, the processor 102 may be configured to encrypt the first cryptogram prior to its transmission. For example, the processor 102 may be configured to generate a plurality of session keys, such as a first session key and a second session key, using secret keys combined with the counter. A message authentication code (MAC) may be generated with the first session key. The MAC may be encrypted with the second session key prior to its transmission for decryption and validation. The processor 122 of server 120 may be configured to generate unique derived keys using the unique identifier and master keys. The processor of server 120 may be configured to generate session keys from the unique derived keys and the counter. The processor 122 of server 120 may be configured to decrypt the encrypted MAC from the cryptogram. The processor 122 of server 120 may be configured to validate the MAC using the session key.

The processor 102 may be configured to transmit the cryptogram via the communication interface 107. For example, the processor 102 may be configured to transmit the cryptogram to one or more applications, such as application 116. In some examples, the processor 102 may be configured to transmit the cryptogram to an application 116 comprising instructions for execution on a second device 110. The processor 102 may be configured to update the counter value after transmission of the cryptogram.

In some examples, the processor 122 of server 120 may be configured to receive the cryptogram transmitted by the processor 112 that was transmitted by processor 102. The application 116 of the client device 110 may be configured to transmit the cryptogram by the processor 102 to the processor 122 server 120. The processor 122 of server 120 may be configured to decrypt the cryptogram.

The processor 102 may be further configured to restrict the virtual card number to a limited use. In other examples, it is understood that processor 122 of server 120 may be configured to perform any number of operations performed by processor 102 of first device 105. For example, the processor 102 may be configured to limited the virtual card to a single use or any number of uses not to exceed a threshold number. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

In some examples, the processor 102 may be configured to select, via one or more cryptographic algorithms, one or more digits of the cryptogram to generate the virtual card number. For example, the processor 102 may be configured to select the first digit of the cryptogram. In another example, the processor 102 may be configured to select the last digit of the cryptogram. In another example, the processor 102 may be configured to select any number(s) and/or any sequence of number(s) between the first digit and the last digit of the cryptogram. In another example, the processor 102 may be configured to select any combination of digits of the cryptogram.

In some examples, the processor 122 of server 120 may be configured to select one or more digits of the cryptogram to generate the virtual card number. In some examples, a sequence of numbers may be selected. The processor 122 may be configured to generate the virtual card number after a successful validation of the cryptogram and/or customer data (e.g., a customer identifier, transaction data). The processor 122 may be configured to transmit the virtual card number to the first device 105.

In some examples, the processor 102 of the first device 105 may be configured to select a sequence of one or more numbers between the first digit and the last digit of the cryptogram. In such examples, the processor 122 of server 120 may be configured to maintain a bitmap to define the sequence order used during dynamic virtual card number generation and validation. The bitmap may be maintained at the virtual card number system level or at the record level.

In some examples, the processor 102 may be further configured to restrict the virtual card number to a time window. For example, the processor 102 may be configured to limit the use of the virtual card number to between a time window range including a first value and a second value. In some examples, the processor 102 may be configured to restrict the dynamic security code for utilization in a time window. Further, the processor 102 may be configured to invalidate the dynamic security code if not utilized within the time window. Without limitation, the time window range may include any number of seconds, minutes, hours, days, weeks, months, years, or the like.

Accordingly, when a user is prompted to input, including but not limited to via a application 116 of second device 110 for providing information to a website to process a transaction, the virtual card number and dynamic security code, the processor 102 of first device 105 may enter the communication field of the device to transmit this information with the cryptogram to the device. In this manner, the application 116 of the second device 110 may be configured to transmit the cryptogram including the counter to the processor 122 of server 120. The processor 122 of server 120 may be configured to permit the dynamic security code and virtual card number for the designated time window until the counter is adjusted. Thus, this implementation enables restricted use of the virtual card number and that requires the physical card itself and the dynamic security code.

Further, the processor 102 may be further configured to synchronize the counter with the server during the time window. For example, the processor 102 may be configured to adjust the counter. In some examples, the processor 102 may be configured to increment the counter with the virtual card number and the dynamic security code during the time window. In other examples, the processor 102 may be configured to decrement the counter with the virtual card number and the dynamic security code during the time window. The increment and/or decrement may be determined by the processor 102 according to a sequence. For example, the processor 102 may be configured to increment the counter by even numbers, odd numbers, or a formula so as to provide increased security and prevent the likelihood of brute force attacks. For example, the processor 102 may be configured to decrement the counter by even numbers, odd numbers, or a formula so as to provide increased security and prevent the likelihood of brute force attacks. It is further understood that the sequence may be selected by the processor so as to avoid increased processing load on the first device 105. In this manner, the one or more cryptographic algorithms may be configured to create a sufficiently high entropy number for the dynamic security code that may be reduce the likelihood of brute force attacks. The processor 122 of server 120 may thus be configured to make a note of the adjustment of the counter of the card, such as an increment or a decrement, so as to associate it with the dynamic security code and virtual card number and also avoid asynchronization with the first device 105. Absent the entry by the processor 102 of first device 105 into the communication field of second device 110, such as the aforementioned tap, swipe, or wave, the dynamic security code and virtual card number generated by the card will not be able to be transmitted, and therefore result in non-compliance of the authentication request.

The dynamic generation of the security code is possible only after the successful validation of cryptogram by, e.g., the processor 120 of server 120. Further, integration with the application 116 of second device 110 may also be required prior to the generation of the security code.

The processor 102 may be further configured to encrypt the virtual card number and the dynamic security code using a session key, such as a session key generated as described herein. After successful validation of the cryptogram and/or customer data, the mobile application 116 may be configured to display the virtual card number and the dynamic security code. A successful validation may be required prior to the display, and/or prior to the use of, the virtual card number and the dynamic security code. Display and/or use of the virtual card number and the dynamic security code may be limited to authorized applications and devices, such as application 116 and server 120. Decryption of the virtual card number and the dynamic security code may be controlled by the hardware security module and/or the managed and integrated application programming interface of the second device 110 and the server 120.

The processor 102 may be configured to transmit the virtual card number and the dynamic security code to complete the authentication request. For example, the processor 102 may be configured to transmit, in response to a scan of a quick response (QR) code, the virtual card number and the dynamic security code. In some examples, the processor 102 may be configured to transmit the virtual card number and the dynamic security code via a notification. Without limitation, the notification may include at least one selected from the group of a pop-up notification, a short message service, and a QR code. The notification may be displayed by the application 116 of the second device 110.

In some examples, the processor 102 may be further configured to encrypt the virtual card number and the dynamic security code prior to transmission. The processor 102 may be configured to perform the encryption using a session key, such as a session key generated as described herein. Display and/or use of the virtual card number and the dynamic security code can be permitted only after successful validation of the cryptogram and/or customer data and limited only to authorized applications and devices, such as application 116 and server 120. Decryption of the virtual card number and the dynamic security code may be controlled by the hardware security module and/or the managed and integrated application programming interface of the second device 110 and the server 120.

Figure 2A:
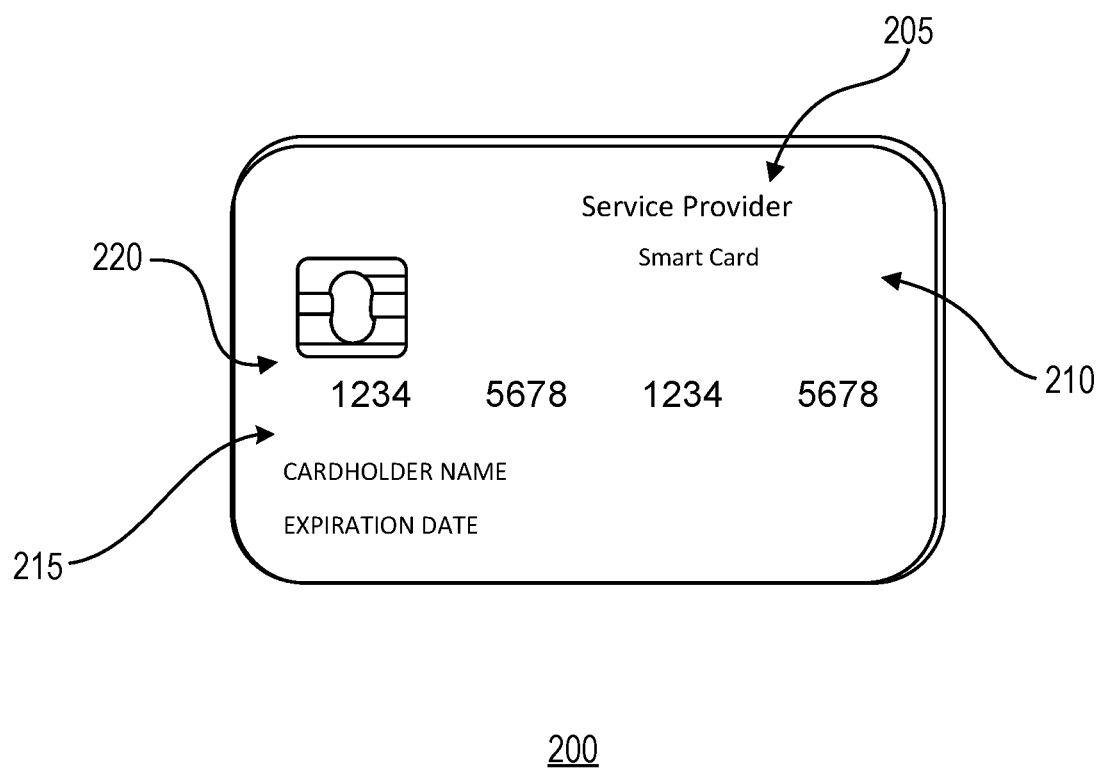
FIG. 2A is an illustration of a first device according to an exemplary embodiment.
Figure 2B:
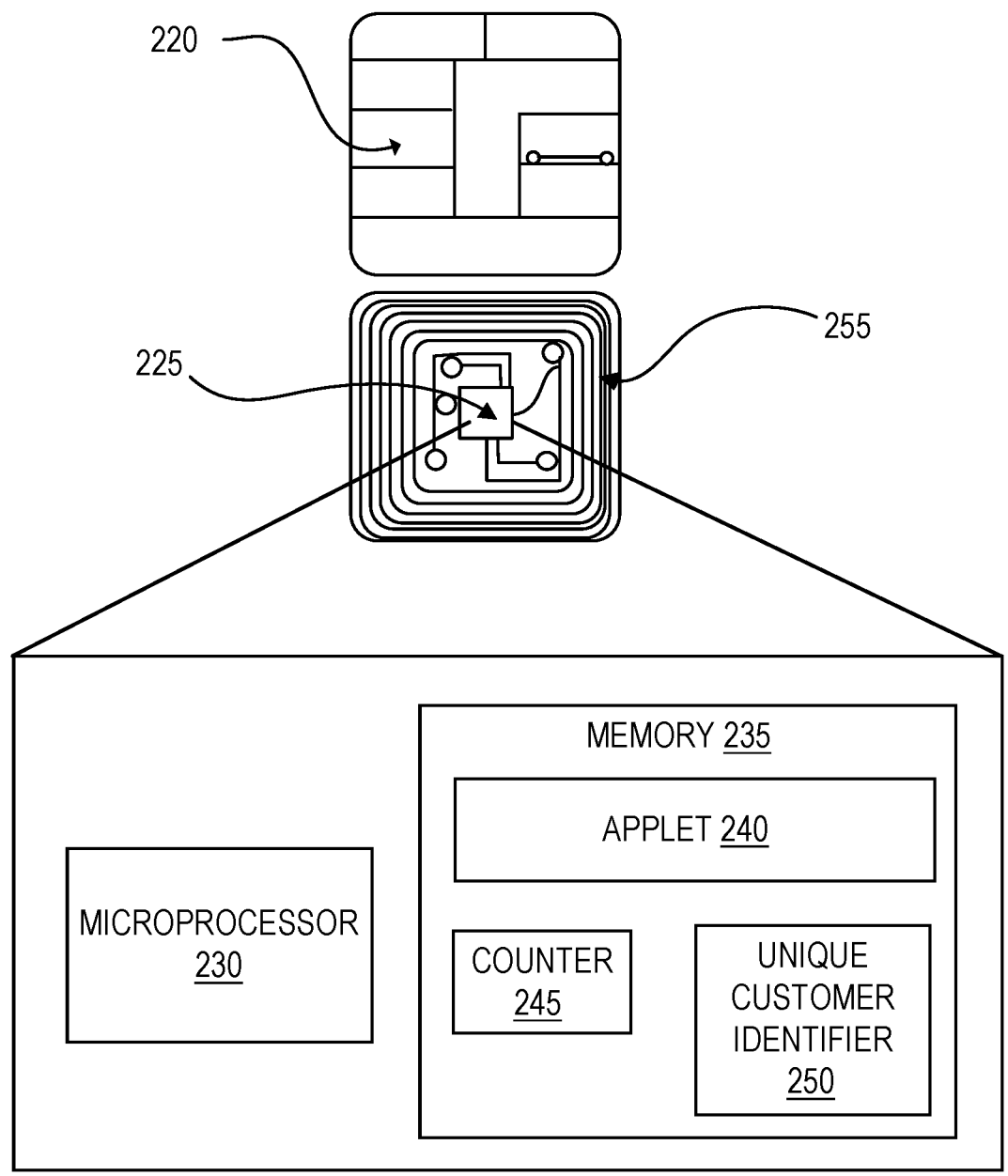
FIG. 2B is an illustration of a contact pad of a first device according to an exemplary embodiment.

FIGS. 2A and 2B illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card or contactless card, which may comprise a payment card, such as a credit card, debit card, or gift card, issued by a service provider 205 displayed on the front or back of the contactless card 200. In some examples, the contactless card 200 is not related to a payment card, and may comprise, without limitation, an identification card, a membership card, a point of access card, and a transportation card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
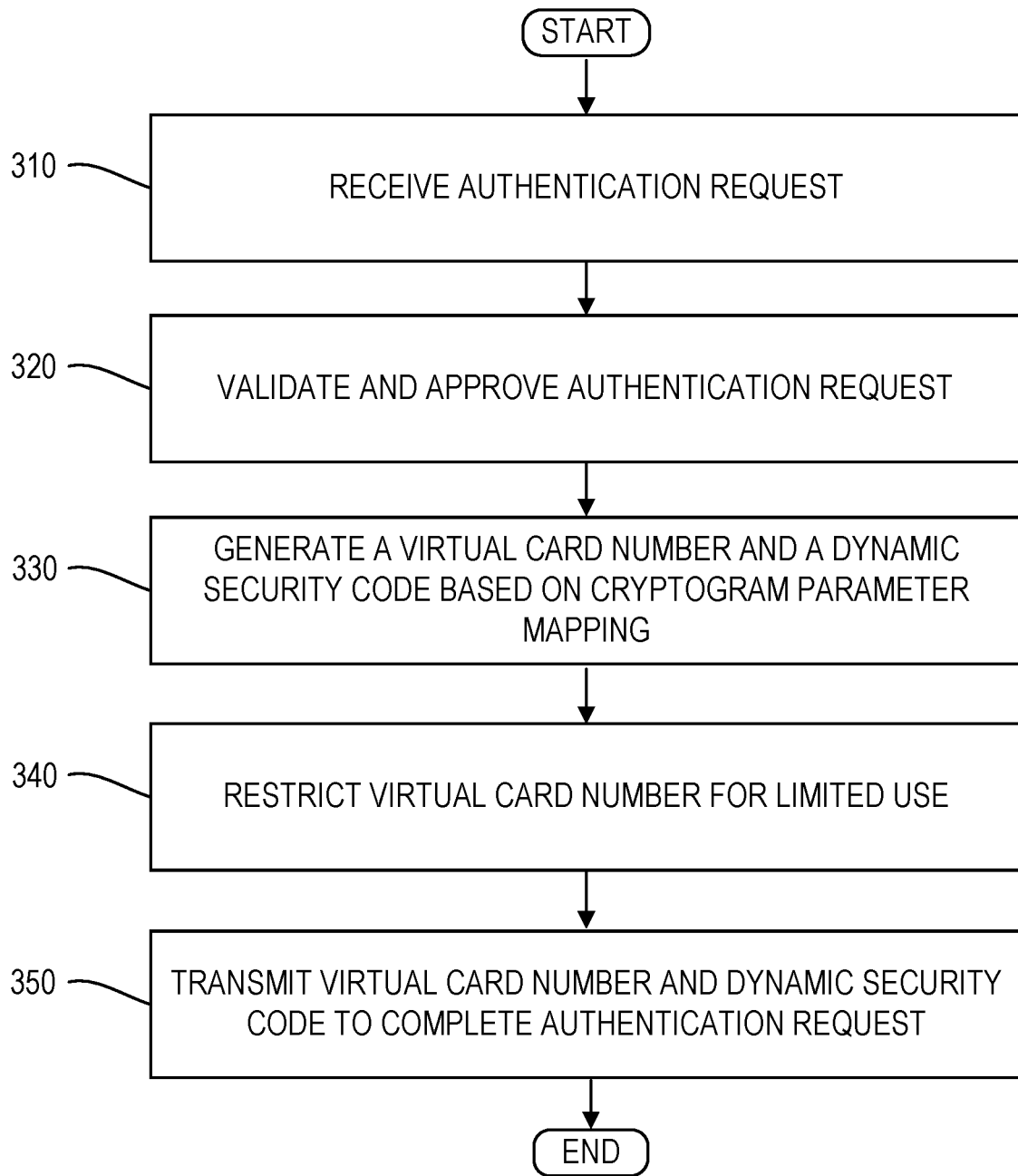
FIG. 3 depicts a method of authentication according to an exemplary embodiment.

FIG. 3 depicts a method 300 of authentication. FIG. 3 may reference the same or similar components of system 100 and first device 200 of FIG. 2A and FIG. 2B.

At block 310, the method may include receiving, by a processor, an authentication request. The processor may belong to a first device, including but not limited to a card, a server, or a client device. In some examples, the processor may be configured to receive an authentication request from any device, including but not limited to a mobile device.

At block 320, the method may include validating and approving, by the processor, the authentication request. This may be performed by any of the methods described herein.

At block 330, the method 300 may include generating, by the processor in response to the authentication request, a virtual card number and a dynamic security code based on mapping with a plurality of parameters of a cryptogram including at least one selected from the group of a unique identifier, a counter, a session key, and a PAN sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

The processor may be configured to transmit, after entry into one or more communication fields of any device, data responsive to the read, such as a first read. For example, the processor may be configured to transmit, after a first entry into a first communication field of a device, the cryptogram. Without limitation, each entry may be associated with a tap, a swipe, a wave, and/or any combination thereof. The cryptogram may be received, upon request, via a near field communication data exchange format (NDEF) read. The processor may be configured to transmit the cryptogram. In some examples, the processor may be configured to encrypt the first cryptogram prior to its transmission. For example, the processor may be configured to generate a plurality of session keys, such as a first session key and a second session key, using secret keys combined with the counter. The MAC may be generated with the first session key. The MAC may be encrypted with the second session key prior to its transmission for decryption and validation. The server may be configured to generate unique derived keys using the unique identifier and master keys. The server may be configured to generate session keys from the unique derived keys and the counter. The server may be configured to decrypt the encrypted MAC from the cryptogram. The server may be configured to validate the MAC using the session key.

The processor may be configured to transmit the cryptogram via the communication interface. For example, the processor may be configured to transmit the cryptogram to one or more applications. In some examples, the processor may be configured to transmit the cryptogram to an application comprising instructions for execution on a second device. The processor may be configured to update the counter value after transmission of the cryptogram.

In some examples, the server may be configured to receive the cryptogram transmitted by the processor. The application of the client device may be configured to transmit the cryptogram by the processor to the server. The server may be configured to decrypt the cryptogram.

At block 340, the method 300 may include restricting the virtual card number to a limited use. For example, the processor may be configured to limited the virtual card to a single use or any number of uses not to exceed a threshold number. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

In some examples, the processor may be configured to select, via one or more cryptographic algorithms, one or more digits of the cryptogram to generate the virtual card number. For example, the processor may be configured to select the first digit of the cryptogram. In another example, the processor may be configured to select the last digit of the cryptogram. In another example, the processor may be configured to select any number(s) and/or any sequence of number(s) between the first digit and the last digit of the cryptogram. In another example, the processor may be configured to select any combination of digits of the cryptogram.

In some examples, the processor may be further configured to restrict the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like.

Accordingly, when a user is prompted to input, including but not limited to via a mobile application for providing information to a website to process a transaction, the virtual card number and dynamic security code, the card may enter the communication field of the device to transmit this information with the cryptogram to the device. In this manner, the application of the device may be configured to transmit the cryptogram including the counter to the server. The server may be configured to permit the dynamic security code and virtual card number for the designated time window until the counter is adjusted. Thus, this implementation enables restricted use of the virtual card number and that requires the physical card itself and the dynamic security code.

Further, the processor may be further configured to synchronize the counter with the server during the time window. For example, the processor may be configured to adjust the counter. In some examples, the processor may be configured to increment the counter with the virtual card number and the dynamic security code during the time window. In other examples, the processor may be configured to decrement the counter with the virtual card number and the dynamic security code during the time window. The increment and/or decrement may be determined by the processor according to a sequence. For example, the processor may be configured to increment the counter by even numbers, odd numbers, or a formula so as to provide increased security and prevent the likelihood of brute force attacks. For example, the processor may be configured to decrement the counter by even numbers, odd numbers, or a formula so as to provide increased security and prevent the likelihood of brute force attacks. It is further understood that the sequence may be selected by the processor so as to avoid increased processing load on the card. In this manner, the one or more cryptographic algorithms may be configured to create a sufficiently high entropy number for the dynamic security code that may be reduce the likelihood of brute force attacks. The server may thus be configured to make a note of the adjusted, such as increment or decrement, counter of the card so as to associate it with the dynamic security code and virtual card number and also avoid asynchronization with the card. Absent the entry by the card into the communication field, such as the aforementioned tap, swipe, or wave, the dynamic security code and virtual card number generated by the card will not be able to be transmitted, and therefore result in non-compliance of the authentication request.

At block 350, the method 300 may include transmitting, by the processor, the virtual card number and the dynamic security code to complete the authentication request. For example, the processor may be configured to transmit the virtual card number and the dynamic security code to complete the authentication request. For example, the processor may be configured to transmit, in response to a scan of a QR code, the virtual card number and the dynamic security code. In some examples, the processor may be configured to transmit the virtual card number and the dynamic security code via a notification. Without limitation, the notification may include at least one selected from the group of a pop-up notification, a short message service, and a QR code. The notification may be displayed by the device.

Figure 4A:
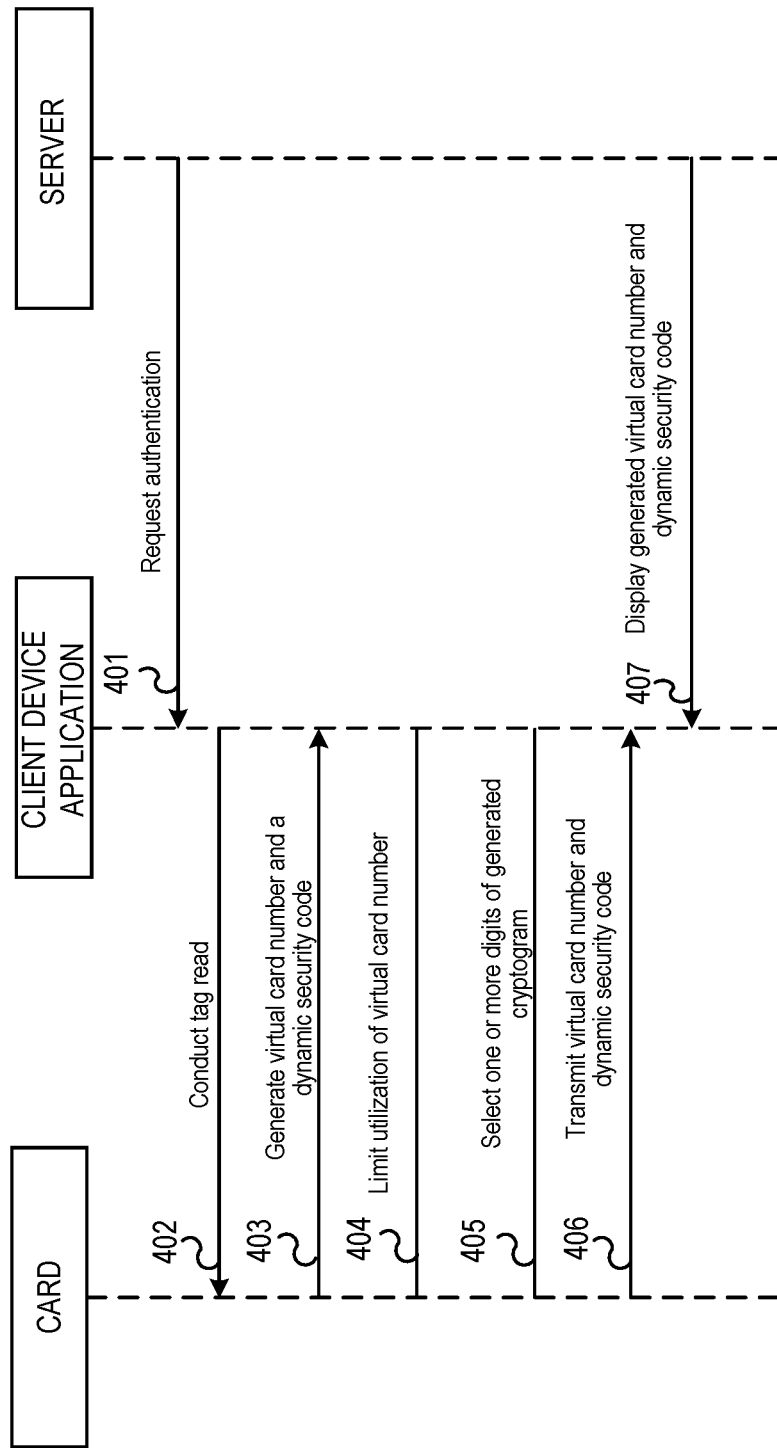
FIG. 4A depicts a sequence diagram of a process for authentication according to an exemplary embodiment.

FIG. 4A depicts a sequence diagram 400 of a process for authentication according to an exemplary embodiment. FIG. 4A may reference the same or similar components of system 100, first device 200 of FIG. 2A and FIG. 2B, and method 300 of FIG. 3.

At step 401, a processor may be configured to receive one or more requests. The processor may belong to a first device, including but not limited to a card (or other first device), a server, or a client device, or a combination thereof. In some examples, the processor may be configured to receive an authentication request from any device, including but not limited to a client device. The request may be transmitted from a processor of a server to a processor or application of an intermediary device, such as a client device, which in turn may be configured to transmit the authentication request to the processor of the card.

At step 402, the processor or application of the client device may be configured to conduct one or more reads. For example, the processor or application may be configured to conduct a read, such as a near field communication read, of a tag of the card. Other information that can be read include a unique identification number associated with the card, a counter (e.g. a counter associated with a number of reads of the first device, a counter associated with the number of transactions involving the first device, an application transaction counter), a shared secret, and a cryptogram. In some examples, a cryptogram can be generated by the card that includes the read data, and the cryptogram can be generating using the read data and/or one or more cryptographic algorithms. In some examples, the shared secret can comprise a number that is known or derived by the application and/or server and stored on the card. The shared secret can be used in generating a cryptogram and/or performing cryptographic operations using one or more cryptographic algorithms. In some examples, the processor or application of the client device may be configured to display a notification or otherwise prompt to conduct the read.

At step 403, the processor may be configured to generate a virtual card number and a dynamic security code based on mapping with a plurality of parameters of the read data, including, for example, a cryptogram including at least one selected from the group of a unique identifier, a counter, a session key, and a PAN sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

In other examples, the processor may receive the virtual card number generated by another device, such as a card, a server, or a client device. The virtual card number may be generated based on information received from the card (e.g., a unique identifier, a counter, a shared secret) and upon successful authentication of the received information. In some examples, the shared secret can be a number that is known or derived by the server and/or the client device and stored on the first device. The shared secret can be included in cryptographic calculations (e.g., used in cryptographic operations and by cryptographic algorithms) but is not transmitted between any of the devices.

The virtual card number can be generated with an initial or default security code value, such as a security code of zero. The virtual card number can be maintained in database of virtual card numbers and transmitted to the processor. The virtual card number can be encrypted by, e.g., a session key, prior to transmission. Upon receipt of the virtual card number, the processor can decrypt the virtual card number and generate the dynamic security code.

The processor may be configured to transmit, after entry into one or more communication fields of any device, data responsive to the read, such as a first read. For example, the processor may be configured to transmit, after a first entry into a first communication field of a device, the cryptogram. Without limitation, each entry may be associated with a tap, a swipe, a wave, and/or any combination thereof. The cryptogram may be received, upon request, via a near field communication data exchange format (NDEF) read. The processor may be configured to transmit the cryptogram. In some examples, the processor may be configured to encrypt the first cryptogram prior to its transmission. For example, the processor may be configured to generate a plurality of session keys, such as a first session key and a second session key, using secret keys combined with the counter. The MAC may be generated with the first session key. The MAC may be encrypted with the second session key prior to its transmission for decryption and validation. The server may be configured to generate unique derived keys using the unique identifier and master keys. The server may be configured to generate session keys from the unique derived keys and the counter. The server may be configured to decrypt the encrypted MAC from the cryptogram. The server may be configured to validate the MAC using the session key.

The processor may be configured to transmit the cryptogram via the communication interface. For example, the processor may be configured to transmit the cryptogram to one or more applications. In some examples, the processor may be configured to transmit the cryptogram to an application comprising instructions for execution on a second device. The processor may be configured to update the counter value after transmission of the cryptogram.

In some examples, the server may be configured to receive the cryptogram transmitted by the processor. The application of the client device may be configured to transmit the cryptogram by the processor to the server. The server may be configured to decrypt the cryptogram.

At step 404, the processor may be configured to restrict the virtual card number to a limited use. For example, the processor may be configured to limited the virtual card to a single use or any number of uses not to exceed a threshold number. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

At step 405, the processor may be configured to select, via one or more cryptographic algorithms, one or more digits of the cryptogram to generate the virtual card number. For example, the processor may be configured to select the first digit of the cryptogram. In another example, the processor may be configured to select the last digit of the cryptogram. In another example, the processor may be configured to select any number(s) and/or any sequence of number(s) between the first digit and the last digit of the cryptogram. In another example, the processor may be configured to select any combination of digits of the cryptogram.

In some examples, the processor may be further configured to restrict the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like.

Accordingly, when a user is prompted to input, including but not limited to via a mobile application for providing information to a website to process a transaction, the virtual card number and dynamic security code, the card may enter the communication field of the device to transmit this information with the cryptogram to the device. In this manner, the application of the device may be configured to transmit the cryptogram including the counter to the server. The server may be configured to permit the dynamic security code and virtual card number for the designated time window until the counter is adjusted. Thus, this implementation enables restricted use of the virtual card number and that requires the physical card itself and the dynamic security code. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

Further, the processor may be further configured to synchronize the counter with the server during the time window. For example, the processor may be configured to adjust the counter. In some examples, the processor may be configured to increment the counter with the virtual card number and the dynamic security code during the time window. In other examples, the processor may be configured to decrement the counter with the virtual card number and the dynamic security code during the time window. The increment and/or decrement may be determined by the processor according to a sequence. For example, the processor may be configured to increment the counter by even numbers, odd numbers, or a formula so as to provide increased security and prevent the likelihood of brute force attacks. For example, the processor may be configured to decrement the counter by even numbers, odd numbers, or a formula so as to provide increased security and prevent the likelihood of brute force attacks. It is further understood that the sequence may be selected by the processor so as to avoid increased processing load on the card. In this manner, the one or more cryptographic algorithms may be configured to create a sufficiently high entropy number for the dynamic security code that may be reduce the likelihood of brute force attacks. The server may thus be configured to make a note of the adjusted, such as increment or decrement, counter of the card so as to associate it with the dynamic security code and virtual card number and also avoid asynchronization with the card. Absent the entry by the card into the communication field, such as the aforementioned tap, swipe, or wave, the dynamic security code and virtual card number generated by the card will not be able to be transmitted, and therefore result in non-compliance of the authentication request.

At step 406, the processor may be configured to transmit the virtual card number and the dynamic security code to complete the authentication request. For example, the processor may be configured to transmit, in response to a scan of a QR code, the virtual card number and the dynamic security code. In some examples, the processor may be configured to transmit the virtual card number and the dynamic security code via a notification. Without limitation, the notification may include at least one selected from the group of a pop-up notification, a short message service, and a QR code.

At step 407, the notification may be displayed by the processor of the device after receipt of the virtual card number and dynamic security code from the processor of the card. In some examples, the notification may be displayed for only a period of time and/or based on whether the user has been logged into an account for a period of time and/or whether the user has been engaged in an active session after logging into the account. The virtual card number and dynamic security code may be stored in a memory of the device.

Figure 4B:
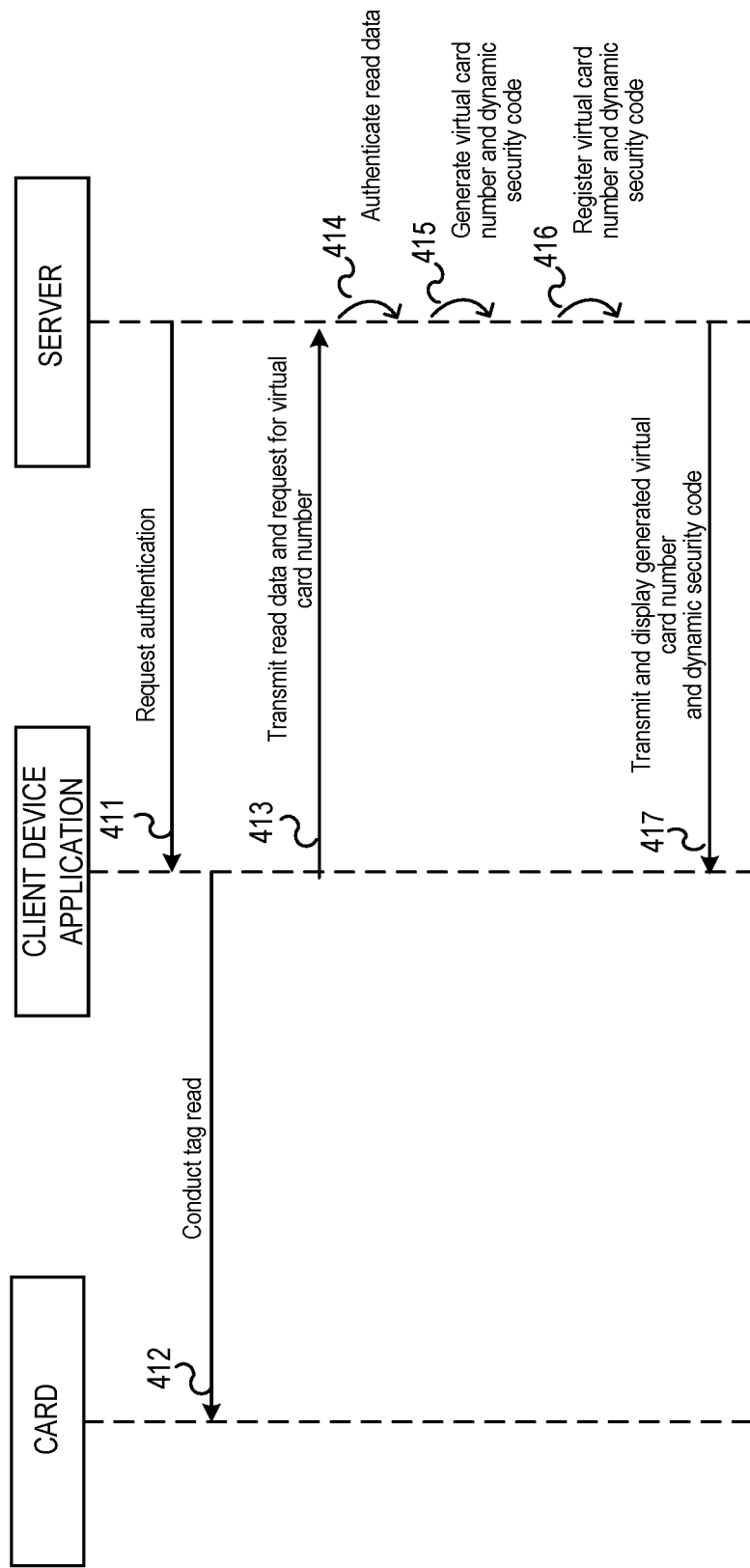
FIG. 4B depicts a sequence diagram of a process for authentication according to an exemplary embodiment.

FIG. 4B depicts a sequence diagram 410 of a process for authentication according to an exemplary embodiment. FIG. 4B may reference the same or similar components of system 100, first device 200 of FIG. 2A and FIG. 2B, method 300 of FIG. 3, and the sequence diagram 400 of FIG. 4A.

At step 411, a processor may be configured to request authentication. The processor may belong to a first device, including but not limited to a card (or other first device), a server, or a client device, or a combination thereof. In some examples, the processor may be configured to transmit an authentication request to any device, including but not limited to an application of a client device. In some examples, the request may be transmitted from a processor of a server to a processor or application of an intermediary device, such as a client device, which in turn may be configured to transmit the authentication request to the processor of the card and/or conduct a read of the card.

At step 412, the processor or application of the client device may be configured to conduct one or more reads. For example, the processor or application of the client device may be configured to conduct a read, such as a near field communication read, of a tag of the card to obtain read data. Other information that can be read and included in the read data include a unique identification number associated with the card, a counter (e.g. a counter associated with a number of reads of the first device, a counter associated with the number of transactions involving the first device, an application transaction counter), a PAN sequence number, a shared secret, and a cryptogram. In some examples, a cryptogram can be generated by the card that includes the read data, and the cryptogram can be generating using the read data and/or one or more cryptographic algorithms. In some examples, the shared secret can comprise a number that is known or derived by the application and/or server and stored on the card. The shared secret can be used in generating a cryptogram and/or performing cryptographic operations using one or more cryptographic algorithms. In some examples, the processor or application of the client device may be configured to display a notification or otherwise prompt to conduct the read.

For example, the processor or application of the client device may be configured to transmit, after entry into one or more communication fields of any device, data responsive to the read, such as a first read. For example, the processor may be configured to transmit, after a first entry into a first communication field of a device, the cryptogram. Without limitation, each entry may be associated with a tap, a swipe, a wave, and/or any combination thereof. The cryptogram may be received, upon request, via a near field communication data exchange format (NDEF) read. The processor or application may be configured to transmit the cryptogram. In some examples, the processor may be configured to encrypt the first cryptogram prior to its transmission. For example, the processor or application may be configured to generate a plurality of session keys, such as a first session key and a second session key, using secret keys combined with the counter. The MAC may be generated with the first session key. The MAC may be encrypted with the second session key prior to its transmission for decryption and validation.

At step 413, the processor or application of the client device can be configured to transmit the read data and a request for a virtual card number to the processor of a server. The processor of the server can be configured to receive the read data and request for virtual card number and, if necessary, decrypt the read data and request for virtual card number by any manner described herein. For example, the server may be configured to generate unique derived keys using the unique identifier and master keys. The server may be configured to generate session keys from the unique derived keys and the counter. The server may be configured to decrypt the encrypted MAC from the cryptogram.

At step 414, the processor of the server can be configured to authenticate the read data. For example, the server may be configured to validate the MAC using the session key.

At step 415, the processor of the server may be configured to generate a virtual card number and a dynamic security code based on mapping with a plurality of parameters of the read data, including, for example, a cryptogram including at least one selected from the group of a unique identifier, a counter, a session key, and a PAN sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

At step 416, the processor the server may be configured to register the virtual card number with one or more payment authorization systems to enable use of the virtual number. In some examples, the processor may be further configured to restrict the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

At step 417, the processor of the server may be configured to transmit the virtual card number and the dynamic security code to complete the authentication request. In some examples, the processor may be configured to transmit the virtual card number and the dynamic security code via a notification. Without limitation, the notification may include at least one selected from the group of a pop-up notification, a short message service, and a QR code.

The notification may be displayed by the processor or application of the client device after receipt of the virtual card number and dynamic security code from the processor of the server. In some examples, the notification may be displayed for only a period of time and/or based on whether the user has been logged into an account for a period of time and/or whether the user has been engaged in an active session after logging into the account. The virtual card number and dynamic security code may be stored in a memory of the client device.

Figure 4C:
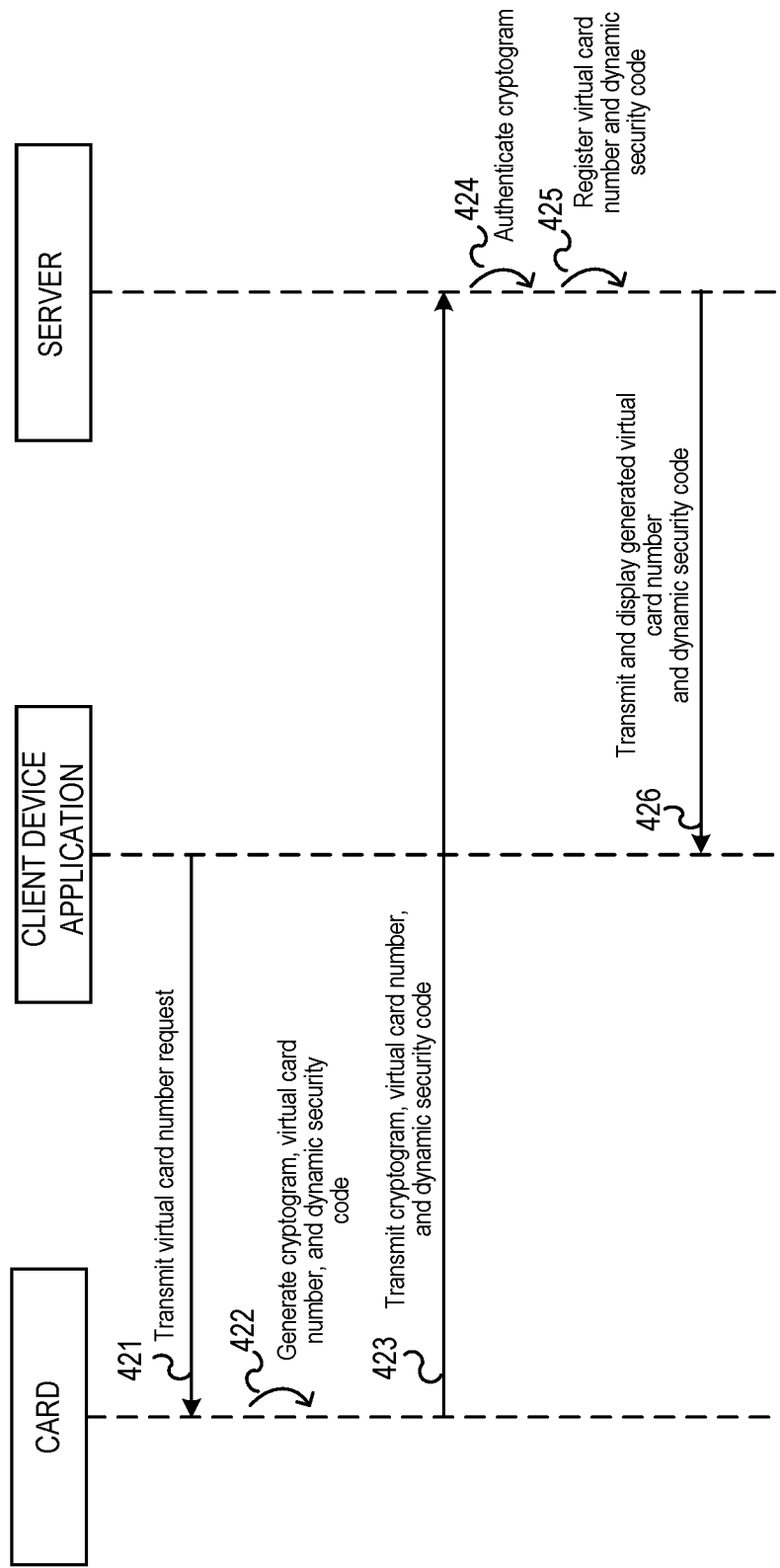
FIG. 4C depicts a sequence diagram of a process for authentication according to an exemplary embodiment.

FIG. 4C depicts a sequence diagram 420 of a process for authentication according to an exemplary embodiment. FIG. 4C may reference the same or similar components of system 100, first device 200 of FIG. 2A and FIG. 2B, method 300 of FIG. 3, the sequence diagram 400 of FIG. 4A, and the sequence diagram 410 of FIG. 4B.

At step 421, a processor may be configured to request authentication and a virtual card number. The processor may belong to a first device, including but not limited to a card (or other first device), a server, or a client device, or a combination thereof. In some examples, the processor may be configured to transmit an authentication request and request for a virtual card number to any device, including but not limited to an application of a client device and the processor of the card. In some examples, the requests may be transmitted from a processor of a server to a processor or application of an intermediary device, such as a client device, which in turn may be configured to transmit the authentication request to the processor of the card and/or conduct a read of the card.

At step 422, the processor of the card may be configured to generate a virtual card number and a dynamic security code based on mapping with a plurality of parameters of the read data, including, for example, a cryptogram including at least one selected from the group of a unique identifier, a counter, a session key, and a PAN sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

In some examples, the processor may be further configured to restrict the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

At step 423, the processor of the card may be configured to transmit the virtual card number and dynamic security code to the server. In some examples, the virtual card number and dynamic security code may be transmitted from the processor of the card to a processor or application of an intermediary device, such as a client device, which in turn may be configured to transmit the virtual card number and the dynamic security code to the processor of the server.

In some examples, prior to transmission, a cryptogram can be generated by the card that includes the virtual card number, dynamic security, and other data, including a unique identification number associated with the card, a counter (e.g. a counter associated with a number of reads of the first device, a counter associated with the number of transactions involving the first device, an application transaction counter, a PAN sequence number), a shared secret, and a cryptogram, using the included data and/or one or more cryptographic algorithms. In some examples, the shared secret can comprise a number that is known or derived by the application and/or server and stored on the card. The shared secret can be used in generating a cryptogram and/or performing cryptographic operations using one or more cryptographic algorithms.

In some examples, the processor of the card may be configured to encrypt the first cryptogram prior to its transmission. For example, the processor may be configured to generate a plurality of session keys, such as a first session key and a second session key, using secret keys combined with the counter. The MAC may be generated with the first session key. The MAC may be encrypted with the second session key prior to its transmission for decryption and validation.

The processor of the server can be configured to receive the read data and request for virtual card number and, if necessary, decrypt the read data and request for virtual card number by any manner described herein. For example, the server may be configured to generate unique derived keys using the unique identifier and master keys. The server may be configured to generate session keys from the unique derived keys and the counter. The server may be configured to decrypt the encrypted MAC from the cryptogram.

At step 424, the processor of the server can be configured to authenticate the read data. For example, the server may be configured to validate the MAC using the session key.

At step 425, the processor the server may be configured to register the virtual card number with one or more payment authorization systems to enable use of the virtual number. In some examples, the processor may be further configured to restrict the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

At step 426, the processor of the server may be configured to transmit the virtual card number and the dynamic security code to complete the authentication request. In some examples, the processor may be configured to transmit the virtual card number and the dynamic security code via a notification. Without limitation, the notification may include at least one selected from the group of a pop-up notification, a short message service, and a QR code.

The notification may be displayed by the processor or application of the client device after receipt of the virtual card number and dynamic security code from the processor of the server. In some examples, the notification may be displayed for only a period of time and/or based on whether the user has been logged into an account for a period of time and/or whether the user has been engaged in an active session after logging into the account. The virtual card number and dynamic security code may be stored in a memory of the client device.

Figure 5:
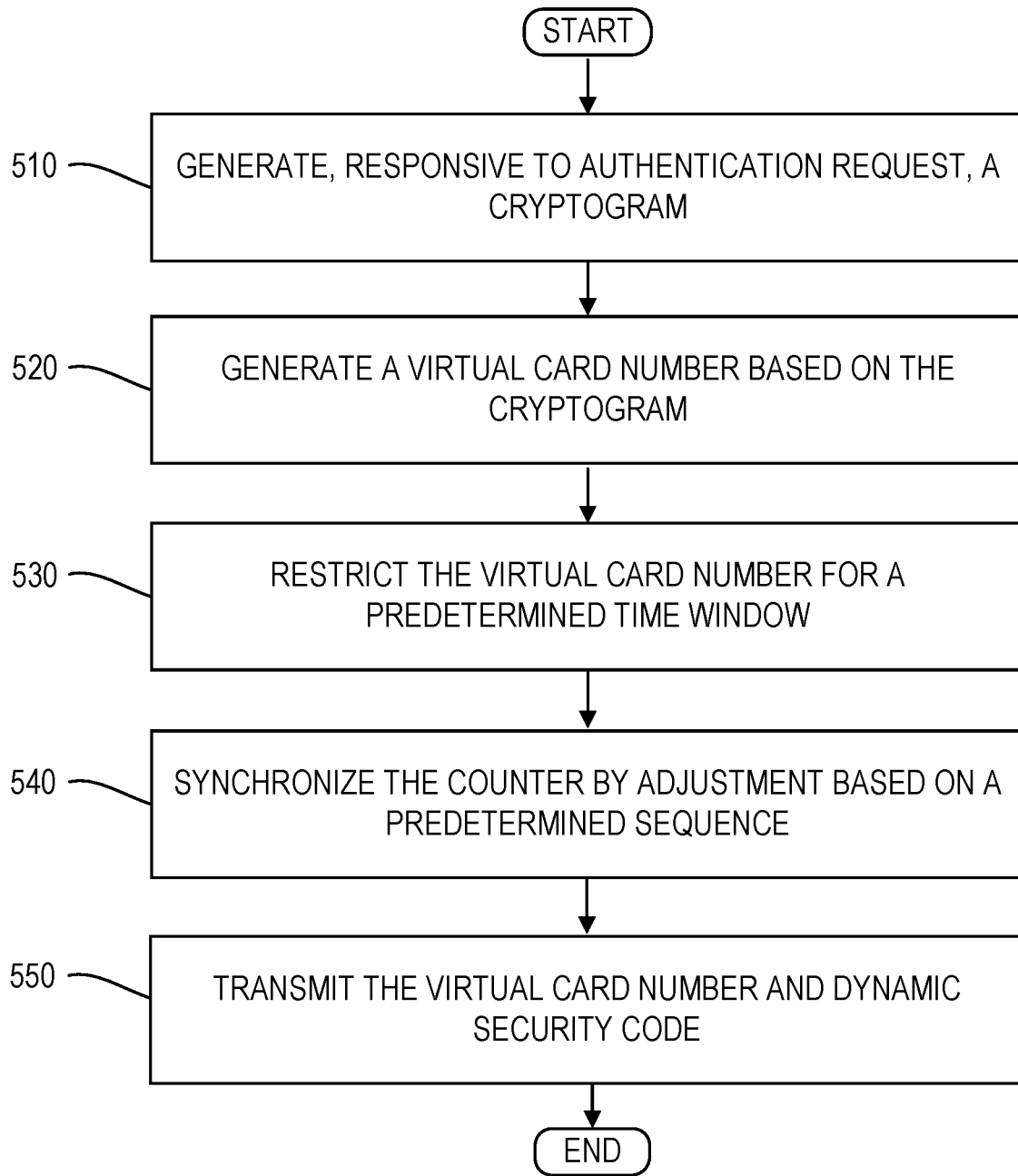
FIG. 5 depicts a method of authentication according to an exemplary embodiment.

FIG. 5 depicts a method of 500 of authentication according to an exemplary embodiment. FIG. 5 may reference the same or similar components of system 100, first device 200 of FIG. 2A and FIG. 2B, method 300 of FIG. 3, the sequence diagram 400 of FIG. 4A, the sequence diagram 410 of FIG. 4B, and the sequence diagram 420 of FIG. 4C.

At block 510, the method may include generating, responsive to an authentication request, a cryptogram. For example, a processor may be configured to generated, responsive to an authentication request from an intermediary device or any other device, a cryptogram. The processor may belong to a first device, including but not limited to a card. In some examples, the processor may be configured to receive an authentication request from any device, including but not limited to a mobile device. The processor may be configured to transmit, after entry into one or more communication fields of any device, data responsive to the read, such as a first read. For example, the processor may be configured to transmit, after a first entry into a first communication field of a device, the cryptogram. Without limitation, each entry may be associated with a tap, a swipe, a wave, and/or any combination thereof. The cryptogram may be received, upon request, via a near field communication data exchange format (NDEF) read. The processor may be configured to transmit the cryptogram. In some examples, the processor may be configured to encrypt the first cryptogram prior to its transmission. For example, the processor may be configured to generate a plurality of session keys, such as a first session key and a second session key, using secret keys combined with the counter. The MAC may be generated with the first session key. The MAC may be encrypted with the second session key prior to its transmission for decryption and validation. The server may be configured to generate unique derived keys using the unique identifier and master keys. The server may be configured to generate session keys from the unique derived keys and the counter. The server may be configured to decrypt the encrypted MAC from the cryptogram. The server may be configured to validate the MAC using the session key.

The processor may be configured to transmit the cryptogram via the communication interface. For example, the processor may be configured to transmit the cryptogram to one or more applications. In some examples, the processor may be configured to transmit the cryptogram to an application comprising instructions for execution on a second device. The processor may be configured to update the counter value after transmission of the cryptogram.

In some examples, a server may be configured to receive the cryptogram transmitted by the processor. The application of the client device may be configured to transmit the cryptogram by the processor to the server. The server may be configured to decrypt the cryptogram.

At block 520, the method 300 may include generating, by the processor, a virtual card number and a dynamic security code based on mapping with a plurality of parameters of a cryptogram including at least one selected from the group of a unique identifier, a counter, a session key, and a PAN sequence number. In some examples, an initial value of the virtual card number is zero. Without limitation, the virtual card number may include a total of up to 16 digits. Also without limitation, the dynamic security code may comprise a card verification value. For example, the card verification value may comprise a total of up to 3 digits. In other examples, an initial value of the virtual card number is non-zero.

In other examples, the processor may receive the virtual card number generated by another device, such as a card, a server, or a client device. The virtual card number may be generated based on information received from the card (e.g., a unique identifier, a counter, and a shared secret) and upon successful authentication of the received information. The virtual card number can be generated with an initial or default security code value, such as a security code of zero. The virtual card number can be maintained in database of virtual card numbers and transmitted to the processor. The virtual card number can be encrypted by, e.g., a session key, prior to transmission. Upon receipt of the virtual card number, the processor can decrypt the virtual card number and generate the dynamic security code.

In some examples, the method may include restricting the virtual card number to a limited use. For example, the processor may be configured to limited the virtual card to a single use or any number of uses not to exceed a threshold number. Further, the processor may be configured to restrict the virtual card number to a limited use for, or to exclude, a type of transaction, a particular merchant, a category of merchant, and/or a transaction at or near a particular location. Without limitation, the processor may be configured to determine the restriction based on evaluation of transaction history information, transaction frequency over a given time period, transaction location, transaction amount, login information, session information, merchant information, and/or user account information.

In some examples, the processor may be configured to select, via one or more cryptographic algorithms, one or more digits of the cryptogram to generate the virtual card number. For example, the processor may be configured to select the first digit of the cryptogram. In another example, the processor may be configured to select the last digit of the cryptogram. In another example, the processor may be configured to select any number(s) and/or any sequence of number(s) between the first digit and the last digit of the cryptogram. In another example, the processor may be configured to select any combination of digits of the cryptogram.

In some examples, another device, such as a card, a server, or a client device, may be configured to select one or more digits of the cryptogram to generate the virtual card number. The virtual card number may be generated after a successful validation of the cryptogram and/or customer data (e.g., a customer identifier, transaction data). The virtual card number can be transmitted to the processor.

At block 530, the method may include restricting, by the processor, the virtual card number to a time window. For example, the processor may be configured to limit the use of the virtual card number to between a time window range including a first value and a second value. In some examples, the processor may be configured to restrict the dynamic security code for utilization in a time window. Further, the processor may be configured to invalidate the dynamic security code if not utilized within the time window. Without limitation, the time window range may include any number of seconds, minutes, hours, days, weeks, months, years, or the like.

Accordingly, when a user is prompted to input, including but not limited to via a mobile application for providing information to a website to process a transaction, the virtual card number and dynamic security code, the card may enter the communication field of the device to transmit this information with the cryptogram to the device. In this manner, the application of the device may be configured to transmit the cryptogram including the counter to the server. The server may be configured to permit the dynamic security code and virtual card number for the designated time window until the counter is adjusted. Thus, this implementation enables restricted use of the virtual card number and that requires the physical card itself and the dynamic security code.

At block 540, the method may include synchronizing, by the processor, the counter with the server during the time window. For example, the processor may be configured to adjust the counter. In some examples, the processor may be configured to increment the counter with the virtual card number and the dynamic security code during the time window. In other examples, the processor may be configured to decrement the counter with the virtual card number and the dynamic security code during the time window. The increment and/or decrement may be determined by the processor according to a sequence. For example, the processor may be configured to increment the counter by even numbers, odd numbers, or a formula so as to provide increased security and prevent the likelihood of brute force attacks. For example, the processor may be configured to decrement the counter by even numbers, odd numbers, or a formula so as to provide increased security and prevent the likelihood of brute force attacks. It is further understood that the sequence may be selected by the processor so as to avoid increased processing load on the card. In this manner, the one or more cryptographic algorithms may be configured to create a sufficiently high entropy number for the dynamic security code that may be reduce the likelihood of brute force attacks. The server may thus be configured to make a note of the adjusted, such as increment or decrement, counter of the card so as to associate it with the dynamic security code and virtual card number and also avoid asynchronization with the card. Absent the entry by the card into the communication field, such as the aforementioned tap, swipe, or wave, the dynamic security code and virtual card number generated by the card will not be able to be transmitted, and therefore result in non-compliance of the authentication request.

At block 550, the method may include transmitting, by the processor, the virtual card number and the dynamic security code to complete the authentication request. For example, the processor may be configured to transmit the virtual card number and the dynamic security code to complete the authentication request. For example, the processor may be configured to transmit, in response to a scan of a QR code, the virtual card number and the dynamic security code. In some examples, the processor may be configured to transmit the virtual card number and the dynamic security code via a notification. Without limitation, the notification may include at least one selected from the group of a pop-up notification, a short message service, and a QR code. The notification may be displayed by the device.

In some aspects, the techniques described herein relate to an authentication system, including: a processor; and a memory, the memory containing a unique identifier, a counter, a session key, and a sequence number, wherein the processor is configured to: receive an authentication request, receive a cryptogram including one or more parameters, the one or more parameters including at least one selected from the group of the unique identifier, the counter, the session key, and the sequence number, generate, in response to the authentication request, a virtual card number and a dynamic security code based on a mapping with the one or more parameters, and transmit the virtual card number and the dynamic security code to complete the authentication request.

In some aspects, the techniques described herein relate to an authentication system, wherein an initial value of the virtual card number is zero.

In some aspects, the techniques described herein relate to an authentication system, wherein the processor is further configured to limit the virtual card number to a single use for a type of transaction.

In some aspects, the techniques described herein relate to an authentication system, wherein the processor is further configured to select, via one or more cryptographic algorithms, one or more digits of the cryptogram to generate the virtual card number.

In some aspects, the techniques described herein relate to an authentication system, wherein the processor is further configured to restrict the virtual card number to a time window. In some aspects, the techniques described herein relate to an authentication system, wherein the processor is further configured to synchronize the counter during the time window.

In some aspects, the techniques described herein relate to an authentication system, wherein the processor is further configured to increment the counter with the virtual card number and the dynamic security code during the time window.

In some aspects, the techniques described herein relate to an authentication system, wherein the processor is further configured to decrement the counter with the virtual card number and the dynamic security code during the time window.

In some aspects, the techniques described herein relate to an authentication system, wherein the processor is further configured to: restrict the dynamic security code for utilization in a time window, and invalidate the dynamic security code if not utilized within the time window.

In some aspects, the techniques described herein relate to an authentication system, wherein the processor is further configured to transmit, in response to a scan of a QR code, the virtual card number and the dynamic security code.

In some aspects, the techniques described herein relate to a method of authentication, including: receiving, by a processor, an authentication request; receiving, by the processor, a cryptogram including one or more parameters, the one or more parameters including at least one selected from the group of a unique identifier, a counter, a session key, and a sequence number; generating, by the processor in response to the authentication request, a virtual card number and a dynamic security code based on a mapping with the one or more parameters; and transmitting, by the processor, the virtual card number and the dynamic security code to complete the authentication request.

In some aspects, the techniques described herein relate to a method, wherein an initial value of the virtual card number is zero.

In some aspects, the techniques described herein relate to a method, further including limiting, by the processor, the virtual card number to a single use for a type of transaction.

In some aspects, the techniques described herein relate to a method, further including selecting, by the processor via one or more cryptographic algorithms, one or more digits of the cryptogram to generate the virtual card number.

In some aspects, the techniques described herein relate to a method, further including restricting, by the processor, the virtual card number to a time window.

In some aspects, the techniques described herein relate to a method, further including synchronizing, by the processor, the counter during the time window.

In some aspects, the techniques described herein relate to a method, further including incrementing, by the processor, the counter with the virtual card number and the dynamic security code during the time window.

In some aspects, the techniques described herein relate to a method, further including decrementing, by the processor, the counter with the virtual card number and the dynamic security code during the time window.

In some aspects, the techniques described herein relate to a method, further including transmitting, by the processor, the virtual card number and the dynamic security code via a notification, the notification including at least one selected from the group of a pop-up notification, a short message service, and a QR code.

In some aspects, the techniques described herein relate to a computer accessible non-transitory medium including computer executable instructions that, when executed on a processor, perform procedures including the steps of: receiving an authentication request; receiving a cryptogram including one or more parameters, the one or more parameters including at least one selected from the group of a unique identifier, a counter, a session key, and a sequence number; generating, in response to the authentication request, a virtual card number and a dynamic security code based on a mapping with the one or more parameters; and transmitting the virtual card number and the dynamic security code to complete the authentication request.

Throughout the present disclosure, reference is made to a card, such as a contact-based card and a contactless card. It is understood that the present disclosure is not limited to a particular type of card, and instead this disclosure encompasses a contact-based card, a contactless card, or any other card. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An authentication system, comprising:
    a contactless card comprising a processor and a memory, the memory containing one or more parameters selected from the group of a unique identifier, a counter, and a session key,
    wherein, after a first entry into a communication field of a client device executing a client application, the contactless card is configured to:
        adjust the counter to generate an adjusted counter value,
        generate a cryptogram using the adjusted counter value and the session key, and
        transmit the cryptogram and the adjusted counter value to the client application executing on the client device; and
    a server in communication with the client device, the server comprising a processor and a memory,
    wherein the server is configured to:
        receive, from the client application, an authentication request including the cryptogram and the adjusted counter,
        generate, in response to a verification of the cryptogram, a virtual card number and a dynamic security code, wherein the dynamic security code is generated based on a mapping with the adjusted counter value, and
        transmit the virtual card number and the dynamic security code to complete the authentication request.

2. The authentication system of claim 1, wherein an initial value of the virtual card number is zero.

3. The authentication system of claim 1, wherein the server is further configured to limit the virtual card number to a single use for a type of transaction.

4. The authentication system of claim 1, wherein the server is further configured to select, via one or more cryptographic algorithms, one or more digits of the cryptogram to generate the virtual card number.

5. The authentication system of claim 1, wherein the server is further configured to adjust the counter with the virtual card number and the dynamic security code by incrementing the counter with the virtual card number and the dynamic security code.

6. The authentication system of claim 1, wherein the server is further configured to adjust the counter with the virtual card number and the dynamic security code by decrementing the counter with the virtual card number and the dynamic security code.

7. The authentication system of claim 1, wherein the server is further configured to:
    restrict the dynamic security code for utilization based on a current counter value, and
    invalidate the dynamic security code if not corresponding to the current counter value.

8. The authentication system of claim 1, wherein the server is further configured to transmit, in response to a scan of a quick response (QR) code, the virtual card number and the dynamic security code.

9. A method of authentication, comprising:
    generating, by a contactless card, a cryptogram comprising one or more parameters selected from the group of a unique identifier, a counter, a session key, and a sequence number;
    transmitting, by the contactless card, the cryptogram and the counter to a client device executing a client application;
    receiving, by a server, an authentication request;
    receiving, by the server from the client device, the cryptogram;
    generating, by the server in response to the authentication request, a virtual card number and a dynamic security code based on a mapping with the one or more parameters of the cryptogram; and
    transmitting, by the server, the virtual card number and the dynamic security code to complete the authentication request.

10. The method of claim 9, wherein an initial value of the virtual card number is zero.

11. The method of claim 9, further comprising limiting, by the server, the virtual card number to a single use for a type of transaction.

12. The method of claim 9, further comprising selecting, by the server via one or more cryptographic algorithms, one or more digits of the cryptogram to generate the virtual card number.

13. The method of claim 9, further comprising adjusting the counter with the virtual card number and the dynamic security code.

14. The method of claim 13, wherein adjusting the counter with the virtual card number and the dynamic security code comprises decrementing, by the server, the counter with the virtual card number and the dynamic security.

15. The method of claim 13, wherein adjusting the counter with the virtual card number and the dynamic security code comprises incrementing, by the server, the counter with the virtual card number and the dynamic security code.

16. The method of claim 9, further comprising transmitting, by the server, the virtual card number and the dynamic security code via a notification, the notification including at least one selected from the group of a pop-up notification, a short message service, and a quick response (QR) code.

17. A computer accessible non-transitory medium comprising computer executable instructions that, when executed on a server comprising a processor, perform procedures comprising the steps of:
    receiving an authentication request;
    receiving a cryptogram including one or more parameters, wherein:
        the cryptogram is generated by a contactless card, and
        the one or more parameters comprising at least one selected from the group of a unique identifier, a counter, a session key, and a sequence number;

generating, in response to the authentication request, a virtual card number and a dynamic security code based on a mapping with the one or more parameters of the cryptogram; and transmitting the virtual card number and the dynamic security code to complete the authentication request.

18. The computer accessible non-transitory medium of claim 17, wherein the counter with the virtual card number and the dynamic security code are adjusted according to a sequence.

19. The computer accessible non-transitory medium of claim 18, the procedures further comprising selecting the sequence to avoid an increased processing load on the processor.

20. The computer accessible non-transitory medium of claim 17, wherein an initial value of the dynamic security code is zero.

\* \* \* \* \*